(12) United States Patent
Jia et al.

(10) Patent No.: US 10,298,513 B2
(45) Date of Patent: May 21, 2019

(54) METHODS, DEVICES, AND SYSTEMS FOR ACCESSING NETWORK

(71) Applicant: Xiaomi Inc., Beijing (CN)

(72) Inventors: Weiguang Jia, Beijing (CN); Qiang Fu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 293 days.

(21) Appl. No.: 15/213,431

(22) Filed: Jul. 19, 2016

(65) Prior Publication Data
US 2017/0034072 A1 Feb. 2, 2017

(30) Foreign Application Priority Data

Jul. 31, 2015 (CN) .......................... 2015 1 0463356

(51) Int. Cl.
*G06F 15/173* (2006.01)
*H04L 12/911* (2013.01)
(Continued)

(52) U.S. Cl.
CPC .............. *H04L 47/70* (2013.01); *H04L 63/20* (2013.01); *H04W 8/186* (2013.01); *H04W 12/06* (2013.01);
(Continued)

(58) Field of Classification Search
CPC ...... H04L 47/70; H04W 48/20; H04W 48/02; H04W 8/186; H04W 12/08; H04W 12/06
See application file for complete search history.

(56) References Cited

U.S. PATENT DOCUMENTS 5,970,467 A * 10/1999 Alavi .................... G06Q 30/02
348/E7.049
8,341,735 B2 12/2012 Larson et al.
(Continued)

FOREIGN PATENT DOCUMENTS

CN 1662865 A 8/2005
CN 102917438 A 2/2013
(Continued)

OTHER PUBLICATIONS

International Search Report of PCT/CN2015/090560, mailed from the State Intellectual Property Office of China dated May 10, 2016.
(Continued)

*Primary Examiner* — Richard G Keehn
(74) *Attorney, Agent, or Firm* — Finnegan, Henderson, Farabow, Garrett & Dunner LLP

(57) ABSTRACT

The present disclosure relates to methods, devices and systems for accessing a network. The methods include: receiving a request message requesting for accessing a network, the request message being broadcast by a first communication device; detecting a current state of the network access device; when the network access device is in a device-access forbidding state, sending a state switching request to a terminal bound with the network access device, the terminal being configured to generate a reply message based on the state switching request; receiving the reply message sent by the terminal; and when the reply message instructs the network access device to switch to a device-access permitting state, switching the state of the network access device to the device-access permitting state.

14 Claims, 20 Drawing Sheets

(51) Int. Cl.
H04W 12/06 (2009.01)
H04W 8/18 (2009.01)
H04W 12/08 (2009.01)
H04W 48/20 (2009.01)
H04L 29/06 (2006.01)
H04W 48/02 (2009.01)

(52) U.S. Cl.
CPC .......... *H04W 12/08* (2013.01); *H04W 48/20* (2013.01); *H04W 48/02* (2013.01)

(56) References Cited

U.S. PATENT DOCUMENTS

| | | | |
|---|---|---|---|
| 8,611,928 B1* | 12/2013 | Bill | H04W 48/04 455/414.2 |
| 9,386,629 B2 | 7/2016 | Tanaka et al. | |
| 2006/0117384 A1 | 6/2006 | Larson et al. | |
| 2007/0064606 A1 | 3/2007 | Uh et al. | |
| 2007/0111794 A1* | 5/2007 | Hogan | A63F 13/12 463/42 |
| 2007/0180100 A1* | 8/2007 | Biggs | G06F 21/554 709/224 |
| 2010/0061356 A1 | 3/2010 | Ovarfordt et al. | |
| 2011/0199898 A1 | 8/2011 | Cho et al. | |
| 2011/0269451 A1 | 11/2011 | Liu et al. | |
| 2013/0034046 A1 | 2/2013 | Ishii et al. | |
| 2014/0184911 A1* | 7/2014 | Davis | H04N 21/4122 348/563 |
| 2014/0304788 A1 | 10/2014 | Sposato et al. | |
| 2014/0337791 A1* | 11/2014 | Agnetta | G06F 3/0481 715/784 |
| 2014/0355587 A1 | 12/2014 | Tanaka et al. | |
| 2015/0058168 A1* | 2/2015 | Garcia | H04L 67/32 705/26.61 |
| 2016/0212692 A1 | 7/2016 | Lee et al. | |
| 2017/0187703 A1* | 6/2017 | Enrique Salpico | H04L 63/0236 |

FOREIGN PATENT DOCUMENTS

| | | |
|---|---|---|
| CN | 102984705 A | 3/2013 |
| CN | 104780588 A | 7/2015 |
| CN | 104812020 A | 7/2015 |
| EP | 2273823 A1 | 1/2011 |
| EP | 2661112 A1 | 11/2013 |
| JP | 2009-521143 A | 5/2009 |
| JP | 2012-514915 A | 6/2012 |
| JP | 2013-038498 A | 2/2013 |
| JP | 2014-236250 A | 12/2014 |
| JP | 2015-518699 A | 7/2015 |
| KR | 10-2010-0005084 A | 1/2010 |
| KR | 10-2015-0026870 A | 3/2015 |
| RU | 2420003 C2 | 5/2011 |
| RU | 2479932 C2 | 4/2013 |
| WO | WO 2011/102624 A2 | 8/2011 |
| WO | WO 2014/187875 A1 | 11/2014 |

OTHER PUBLICATIONS

Extended European Search Report issued in European Patent Application No. EP 16163622.0, dated Jan. 9, 2017.
English version of International Search Report of PCT/CN2015/090560, mailed from the State Intellectual Property Office of China dated May 10, 2016.
Notification of the Results of Examination of Patentability issued in Russian Patent Application No. 2016113885/08 (021822), dated May 15, 2017.
Zigbee Alliance, "ZigBee IP Specification", ZigBee Document 095023r34, Revision 34, dated Mar. 2014.

* cited by examiner

400

Broadcasting to Network Access Device Request Message Requesting for Accessing Network, Network Access Device Being Configured to, Detect Current State of Network Access Device, and If Network Access Device Is in Device-Access Forbidding State, Send State Switching Request to Terminal Bound with Network Access Device — 402

510

| Terminal Receives State Switching Request Sent by Network Access Device Bound with Terminal, State Switching Request Including Device Identification List, and Device Identification List Including Device Identification of Each Communication Device that Broadcasts Request Message During Preset Time Period Starting from and Including Point in Time when Network Access Device Receives Request Message Broadcast by First Communication Device | 510-1 |

Network Access Device Changes Device-Access Forbidding State to Device-Access Permitting State, and Maintains Device-Access Permitting State for Preset Time Window — 518-1

Fig. 5-6

METHODS, DEVICES, AND SYSTEMS FOR ACCESSING NETWORK

CROSS-REFERENCE TO RELATED APPLICATIONS

The present application is based upon and claims priority to Chinese Patent Application No. 201510463356.3, filed Jul. 31, 2015, the entire contents of which are incorporated herein by reference.

TECHNICAL FIELD

The present disclosure generally relates to the field of computer technology and, more particularly, to methods, devices, and systems for accessing a network.

BACKGROUND

Various communication technologies have been used for network access. For example, Zigbee is a kind of two-way short-distance wireless communication technology, with low power consumption, low transmission rate, and low cost. A Zigbee device is typically required to connect to a network via a Zigbee gateway, in order to communicate with other devices in the network.

SUMMARY

According to a first aspect of the present disclosure, there is provided a method for use in a network access device, the method comprising: receiving a request message requesting for accessing a network, the request message being broadcast by a first communication device; detecting a current state of the network access device; when the network access device is in a device-access forbidding state, sending a state switching request to a terminal bound with the network access device, the terminal being configured to generate a reply message based on the state switching request; receiving the reply message sent by the terminal; and when the reply message instructs the network access device to switch to a device-access permitting state, switching the state of the network access device to the device-access permitting state.

According to a second aspect of the present disclosure, there is provided a method for use in a terminal, comprising: receiving a state switching request from a network access device bound with the terminal, the state switching request being sent by the network access device after the network access device determines that the network access device is currently in a device-access forbidding state upon receiving a request message broadcast by a first communication device requesting for accessing a network; generating a reply message based on the state switching request; and sending the reply message to the network access device, wherein the network access device is configured to, if the reply message instructs the network access device to switch to a device-access permitting state, switch the state of the network access device to the device-access permitting state.

According to a third aspect of the present disclosure, there is provided a network access device, comprising: a processor; and a memory for storing instructions executable by the processor; wherein the processor is configured to perform: receiving a request message requesting for accessing a network, the request message being broadcast by a first communication device; detecting a current state of the network access device; when the network access device is in a device-access forbidding state, sending a state switching request to a terminal bound with the network access device, the terminal being configured to generate a reply message based on the state switching request; receiving the reply message sent by the terminal; and when the reply message instructs the network access device to switch to a device-access permitting state, switching the state of the network access device to the device-access permitting state.

According to a fourth aspect of the present disclosure, there is provided a terminal, comprising: a processor; and a memory for storing instructions executable by the processor; wherein the processor is configured to perform: receiving a state switching request from a network access device bound with the terminal, the state switching request being sent by the network access device after the network access device determines that the network access device is currently in a device-access forbidding state upon receiving a request message broadcast by a first communication device requesting for accessing a network; generating a reply message based on the state switching request; and sending the reply message to the network access device, wherein the network access device is configured to, if the reply message instructs the network access device to switch to a device-access permitting state, switch the state of the network access device to the device-access permitting state.

According to a fifth aspect of the present disclosure, there is provided a communication device, comprising: a processor; and a memory for storing instructions executable by the processor; wherein the processor is configured to perform: broadcasting to a network access device a request message requesting for accessing a network; and wherein the network access device is configured to: detect a current state of the network access device; and when the network access device is in a device-access forbidding state, send a state switching request to a terminal bound with the network access device.

It is to be understood that both the foregoing general description and the following detailed description are exemplary and explanatory only and are not restrictive of the invention, as claimed.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

FIG. 5-1 is a flowchart of a method for accessing a network, according to an exemplary embodiment.

FIG. 5-2 is a flowchart of a step in the method of FIG. 5-1, according to an exemplary embodiment.

FIG. 5-3 is a flowchart of a step in the method of FIG. 5-1, according to an exemplary embodiment.

FIG. 5-4 is a flowchart of a step in the method of FIG. 5-1, according to an exemplary embodiment.

FIG. 5-5 is schematic diagram illustrating a display interface of a terminal, according to an exemplary embodiment.

FIG. 5-6 is a flowchart of a step in the method of FIG. 5-1, according to an exemplary embodiment.

FIG. 5-7 is a flowchart of a step in the method of FIG. 5-1, according to an exemplary embodiment.

FIG. 5-8 is a flowchart of a step in the method of FIG. 5-1, according to an exemplary embodiment.

FIG. 6 is a block diagram of a device for accessing a network, according to an exemplary embodiment.

FIG. 7 is a block diagram of a device for accessing a network, according to an exemplary embodiment.

FIG. 8 is a block diagram of a device for accessing a network, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

Figure 1:
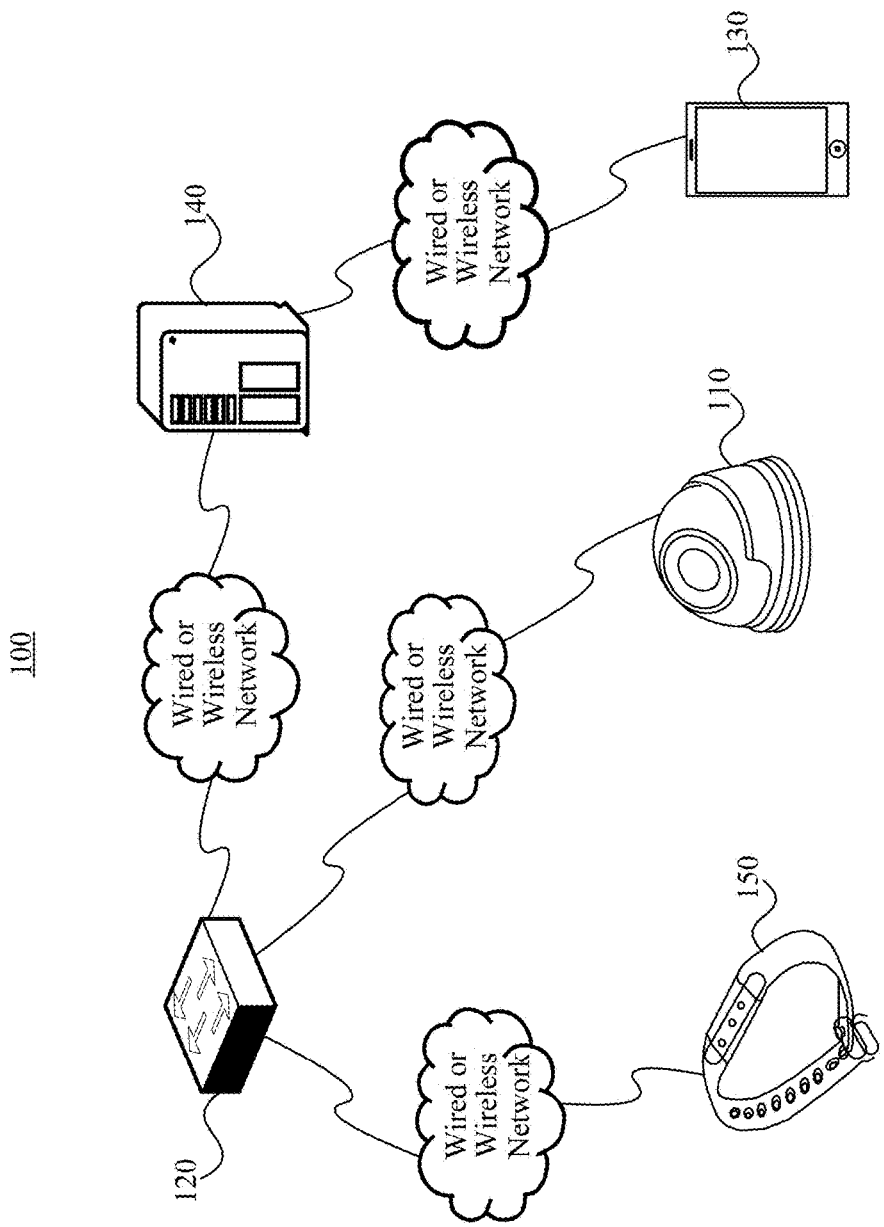
FIG. 1 is a schematic diagram illustrating an implementation environment of disclosed methods for accessing a network, according to an exemplary embodiment.

FIG. 1 is a schematic diagram illustrating an implementation environment 100 of disclosed methods for accessing a network, according to an exemplary embodiment. Referring to FIG. 1, the implementation environment 100 includes a first communication device 110, a network access device 120, and a terminal 130. Optionally, the implementation environment 100 may also include a server 140 and a second communication device 150.

As shown in FIG. 1, the first communication device 110 and the network access device 120, the network access device 120 and the server 140, the server 140 and the terminal 130, and the second communication device 150 and the network access device 120 may connect to each other through a wired or wireless network. Generally, the network access device 120 may also be directly connected to the terminal 130 through a wired or wireless network. It should be noted that the connection formed between any two of the above devices may be the same or may be different. For example, the first communication device 110 and the network access device 120 may be connected through a wired network, while the network access device 120 and the terminal 130 may be connected through a wireless network. The wireless network may include but not limited to Bluetooth, infrared, Wireless-Fidelity (WIFI), data, and Zigbee network.

The first communication device 110 is a device requesting for accessing the network. For example, the first communication device 110 may be a smart camera, a smart socket, a smart bracelet, a smart TV, an infrared remote control, and the like. In the example shown in FIG. 1, the first communication device 110 is a smart camera. The first communication device 110 may broadcast a request message requesting for accessing the network, to the network access device 120. The request message may contain a device identification of the first communication device 110.

Optionally, the request message may also contain a type identification or an address of the first communication device 110. The address may be a media access control (MAC) address of the first communication device 110. The request message broadcast by the first communication device 110 may be a beacon request message. In one embodiment, the first communication device 110 may broadcast a request message to the network access device 120 when the first communication device 110 is powered on, and detects that the first communication device 110 is not connected to a network and has not saved information for accessing a network.

The network access device 120 is a device capable of providing a service of connecting a communication device to a network. For example, the network access device 120 may be a gateway, a router, and the like. The network access device 120 may receive from the first communication device 110 a request message requesting for accessing the network. Then the network access device 120 may detect a current state of the network access device 120. When the network access device 120 is currently in a device-access forbidding state, the network access device 120 may send a state switching request to a terminal (e.g., the terminal 130) bound with the network access device 120. The network access device 120 may receive a reply message sent by the terminal 130. When the reply message instructs the network access device 120 to switch the state of the network access device 120 to a device-access permitting state, the network access device 120 may switch the state of the network access device 120 to a device-access permitting state and maintain the network access device 120 in the device-access permitting state for a preset time window. Afterwards, if the first communication device 110 broadcasts a second request message to the network access device 120 within the preset time window, the network access device 120 may connect the first communication device 110 to the network.

Optionally, if the request message broadcast by the first communication device 110 contains the device identification of the first communication device 110, the state switching request sent to the terminal 30 by the network access device 120 may also contain the device identification of the first communication device 110. The network access device 120 may send a state switching request to the terminal 130 immediately after the network access device 120 receives the request message broadcast by the first communication device 110. Alternatively, the network access device 120 may send a state switching request to the terminal 130, after a preset time period has elapsed since the network access device 120 receives the request message broadcast by the first communication device 110. If the network access device 120 sends a state switching request after the preset time period has elapsed, the network access device 120 may send to the terminal 130 a state switching request containing a device identification list. The device identification list may include the device identification of each communication device that sends a request message during the preset time period. For example, the request message may contain a device identification of the second communication device 150. The user of the terminal 130 can select a device from the device identification list to permit the device to access the network. Based on a target device identification contained in the reply message, the network access device 120 may connect a communication device corresponding to the target device identification to the network, and then send to the communication device corresponding to the target device identification a response message indicating that the communication device corresponding to the target device identification has been properly connected to the network.

Optionally, if the network access device 120 is currently in a device-access permitting state, the network access device 120 may determine whether the first communication device 110 is permitted by the network access device 120 to access the network. If the first communication device 110 is permitted by the network access device 120 to access the network, the network access device 120 connects the first communication device 110 to the network, and sends to the first communication device 110 a response message indicating that the first communication device 110 has been properly connected to the network. The request message broadcast by the first communication device 110 may include at least one of the type identification or the address of the first communication device 110. Correspondingly, the network access device 120 may determine, based on the type identification or the address of the first communication device 110, whether the first communication device 110 is permitted by the network access device 120 to access the network. For example, the network access device 120 may determine, based on the type identification of first communication device 110, whether the type of the first communication device 110 is permitted by the network access device 120 to access the network. If the type of the first communication device 110 is permitted to access the network, the network access device 120 determines that the first communication device 110 is permitted to access the network. For another example, the network access device 120 may determine whether the address of the first communication device 110 belongs to a range of addresses permitted by the network access device 120 to access the network. If the address of the first communication device 110 belongs to a range of addresses permitted by the network access device 120 to access the network, the network access device 120 determines that the first communication device 110 is permitted to access the network.

The terminal 130 may be a terminal bound with the network access device 120. The terminal 130 may control the device access state of the network access device 120. For example, the terminal 130 may be a smart mobile phone, a tablet computer, a smart TV, a desktop computer, and the like. The terminal 130 may receive a state switching request sent by the network access device 120. Based on the state switching request, the terminal 130 generates a reply message, and sends the reply message to the network access device 120. The reply message may instruct the network access device 120 to switch the state of the network access device 120 to a device access permitting state.

Optionally, the state switching request contains a device identification of the first communication device 110. The terminal 130 may receive from the network access device 120 a state switching request containing a device identification list. The device identification list includes the device identification of each communication device that sends a request message during a preset time period starting from and including the point in time when the network access device 120 receives the request message sent by the first communication device 110. Based on the state switching request, the terminal 130 may display the device identification list; receive a user-generated trigger instruction for selecting a target device identification (for example, a device identification of the second communication device 150) from the device identification list; generate, based on the trigger instruction, a reply message containing the target device identification; and send the reply message to the network access device 120, for the network access device 120 to connect the communication device corresponding to the target device identification to the network.

It should be noted that, a binding relationship between the terminal 130 and the network access device 120 may be established in advance. The process of establishing the binding relationship between terminal 130 and the network access device 120 may be performed by the server 140. Moreover, through the server 140, the network access device 120 may send the state switching request to the terminal 130, and the network access device 120 may receive the reply message sent by the terminal 130.

It should be further noted that, the second communication device 150 and the first communication device 110 in the implementation environment 100 may be the same or different, which is not limited by the present disclosure.

Figure 2:
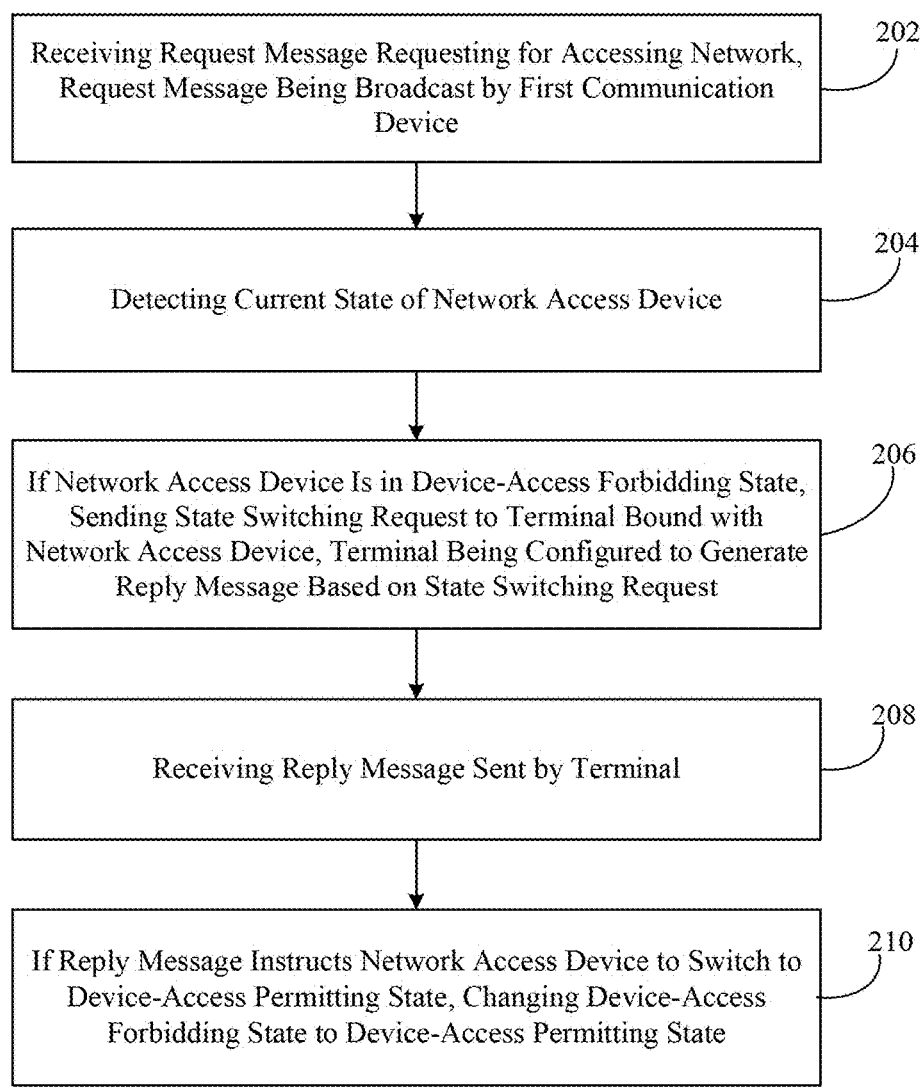
FIG. 2 is a flowchart of a method for accessing a network, according to an exemplary embodiment.

FIG. 2 is a flowchart of a method 200 for accessing a network, according to an exemplary embodiment. For example, the method 200 may be applied in the network access device 120 (FIG. 1). As shown in FIG. 2, the method 200 may include the following steps.

In step 202, the network access device receives a request message requesting for accessing a network. The request message is broadcast by the first communication device.

In step 204, the network access device detects a current state of the network access device.

In step 206, if the network access device is currently in a device-access forbidding state, the network access device sends a state switching request to a terminal bound with the network access device. The terminal is configured to generate a reply message based on the state switching request.

In step 208, network access device receives the reply message sent by the terminal.

In step 210, if the reply message includes an instruction of switching the state of the network access device to a device-access permitting state, the network access device switches its state to a device-access permitting state.

Figure 3:
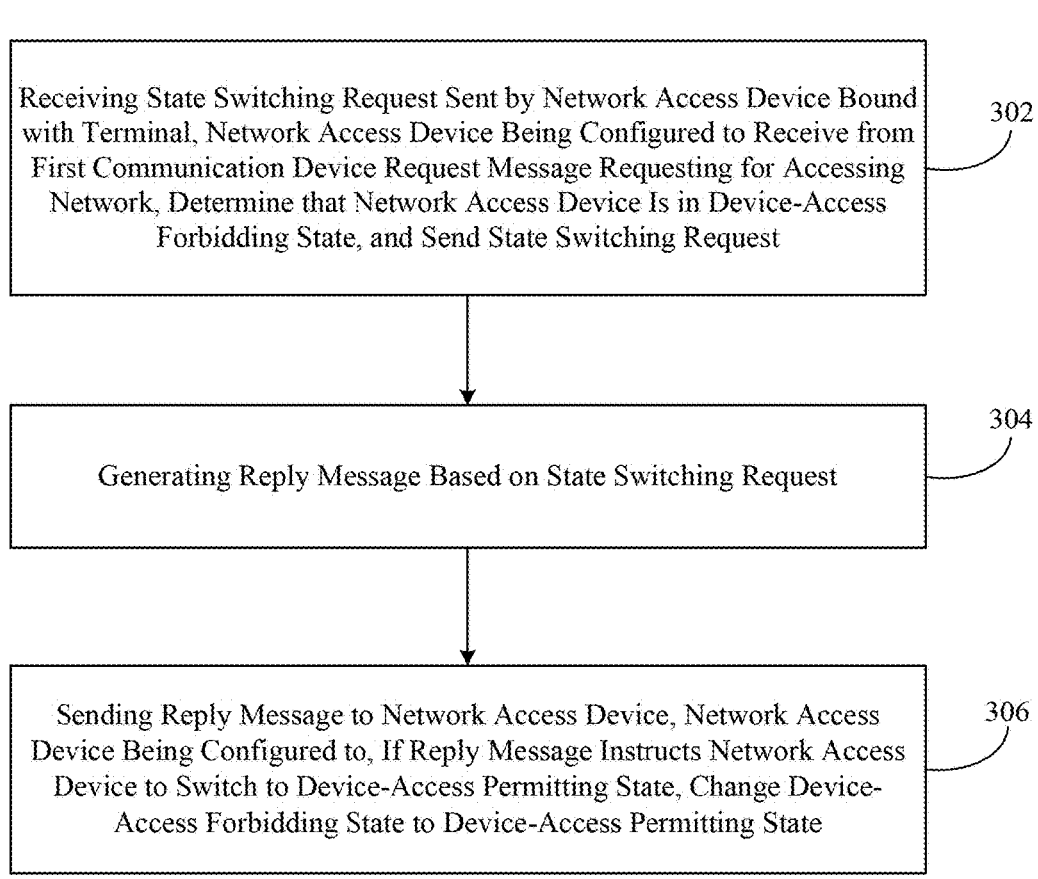
FIG. 3 is a flowchart of a method for accessing a network, according to an exemplary embodiment.

FIG. 3 is a flowchart of a method 300 for accessing a network, according to an exemplary embodiment. For example, the method 300 may be applied in the terminal 130 (FIG. 1). As shown in FIG. 3, the method 300 may include the following steps.

In step 302, the terminal receives a state switching request sent by a network access device bound with the terminal. The network access device may send the state switching request after determining that the network access device is currently in a device-access forbidding state. The network access device may make the determination upon receiving a request message requesting for accessing the network. The request message may be broadcast by a first communication device.

In step 304, the terminal generates a reply message based on the state switching request.

In step 306, the terminal sends the reply message to the network access device. The network access device is configured to, if the reply message instructs the network access device to switch the state of the network access device to a device-access permitting state, switch the state of the network access device to the device-access permitting state.

Figure 4:
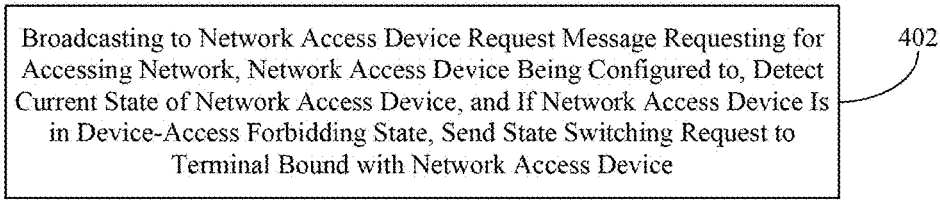
FIG. 4 is a flowchart of a method for accessing a network, according to an exemplary embodiment.

FIG. 4 is a flowchart of a method 400 for accessing a network, according to an exemplary embodiment. For example, the method 400 may be applied in the first communication device 110 (FIG. 1). As shown in FIG. 4, the method 400 may include step 402.

In step 402, the first communication device broadcasts to the network access device a request message requesting for accessing the network. The network access device is configured to detect a current state of the network access device. If the network access device is currently in a device-access forbidding state, the network access device may send a state switching request to a terminal bound with the network access device.

Optionally, the request message may contain a device identification of the first communication device. The request message may also contain at least one of a type identification of the first communication device or an address of the first communication device.

Figures 1, 5:
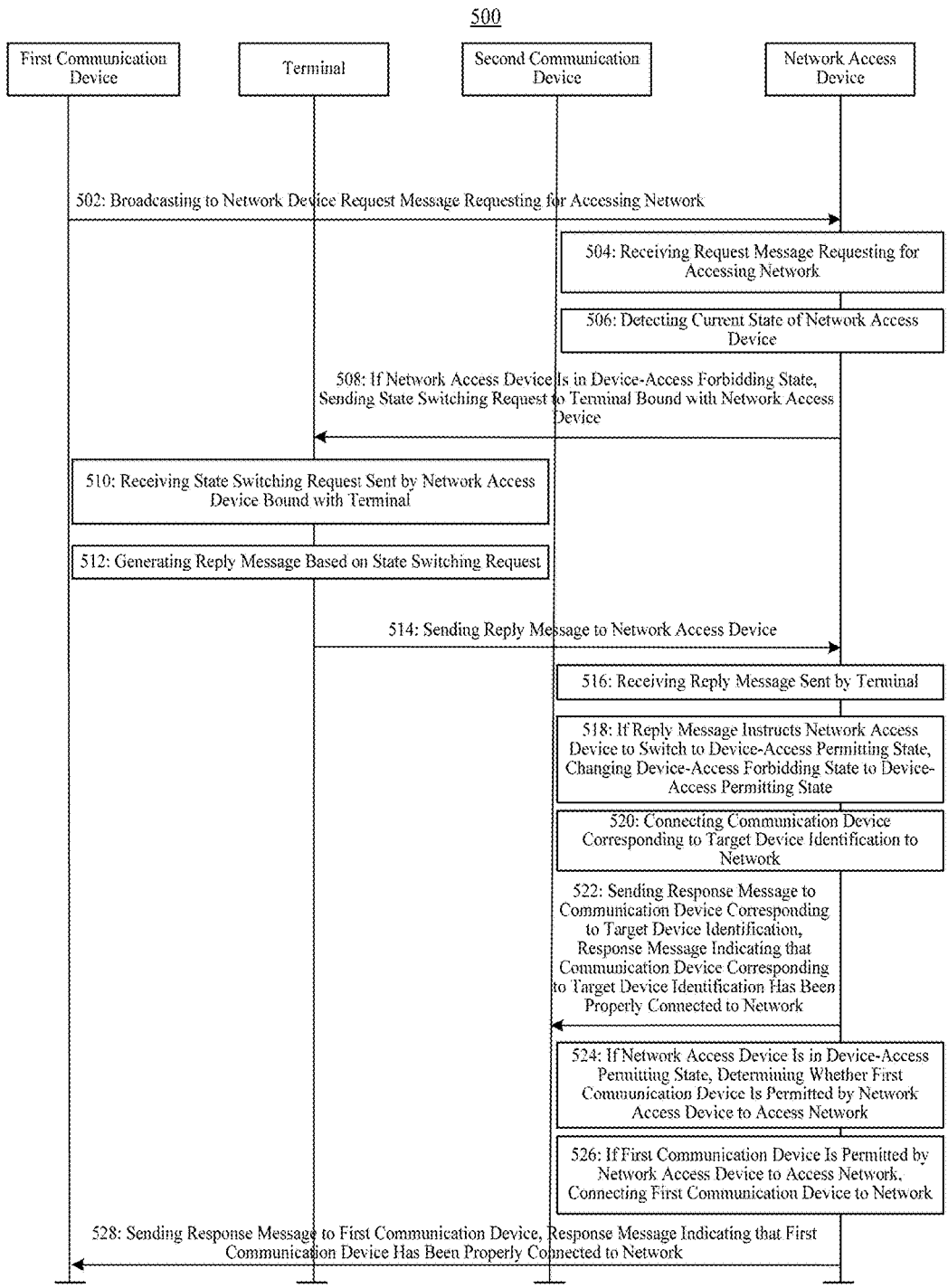
Figures 2, 5:
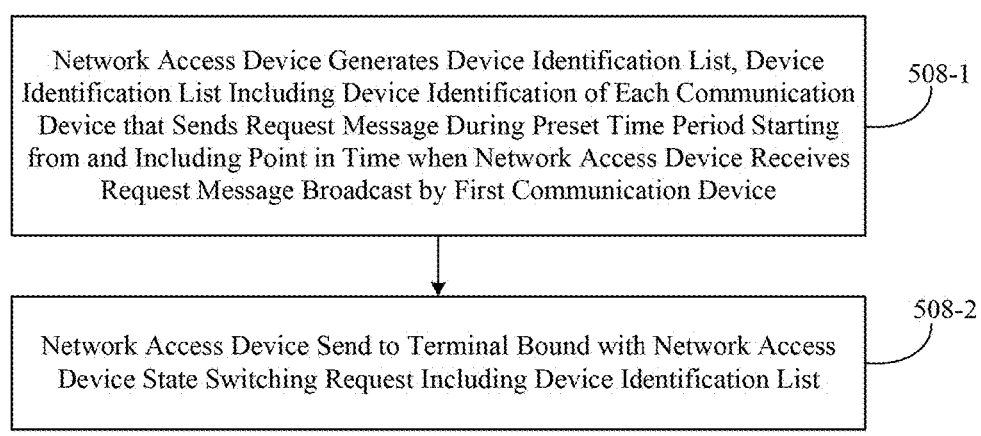
Figures 4, 5:
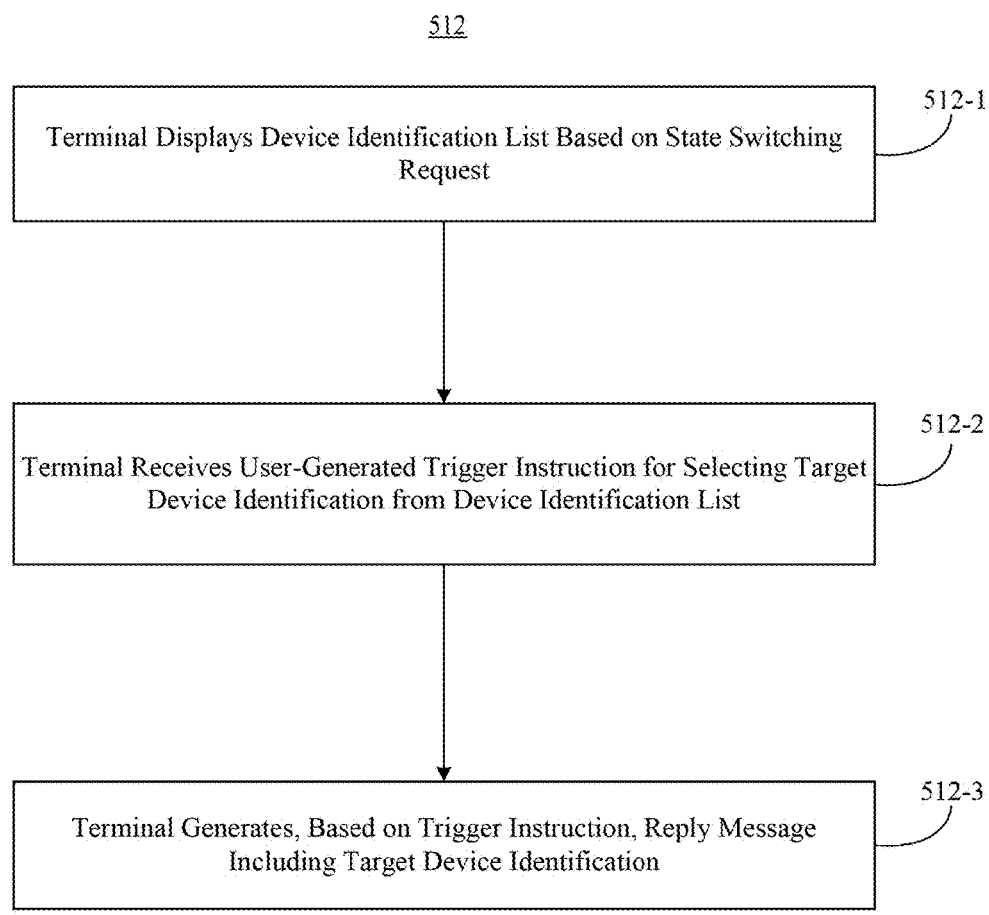
Figure 5:
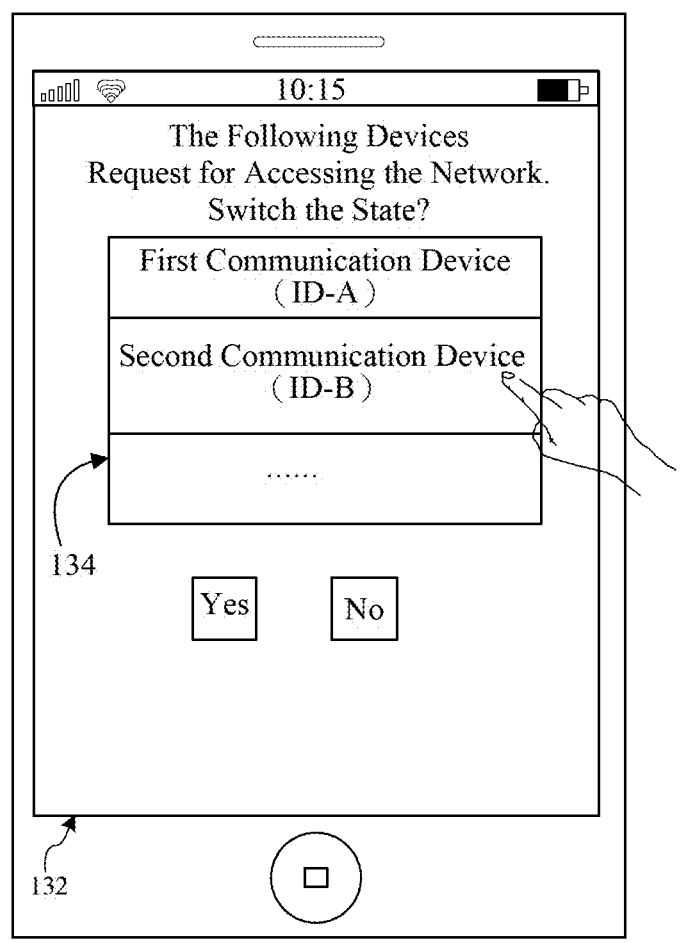

FIG. 5-1 is a flowchart of a method 500 for accessing a network, according to an exemplary embodiment. For example, the method 500 may be applied in the implementation environment 100 (FIG. 1). As shown in FIG. 5-1, the method 500 may include the following steps.

In step 502, a first communication device 110 broadcasts to a network access device 120 a request message requesting for accessing a network. The network access device 120 is configured to detect a current state of the network access device 120, and if the network access device 120 is currently in a device-access forbidding state, send a state switching request to a terminal 130 bound with the network access device 120.

For example, if the first communication device 110 is not connected to the network, the first communication device 110 may broadcast to the network access device 120 the request message requesting for accessing the network, such that the network access device 120 may provide a network access service to the first communication device 110.

The request message may contain a device identification of the first communication device 110, and may also contain at least one of a type identification or an address of the first communication device 110. For example, the request message may be a beacon request message, and the address of the first communication device 110 may be a MAC address of the first communication device 110. The following description assumes that the first communication device 110 has a device identification "ID-A," a type identification "ID-m," and an MAC address "ID-2." Accordingly, the request message may include the device identification "ID-A," and at least one of the type identification "ID-m" or the MAC address "ID-2."

In exemplary embodiments, the first communication device 110 may broadcast the request message after the first communication device 110 is powered on and detects that the first communication device 110 is not connected to the network. Alternatively, the first communication device 110 may broadcast the request message after the first communication device 110 is reset. The present disclosure does not limit the timing or manner of broadcasting the request message. In one embodiment, the first communication device 110 has accessed the network before and thus has saved network access information therein. When the first communication device 110 is powered on, the first communication device 110 may first access the network according to the saved network access information.

In step 504, the network access device 120 receives the request message broadcast by the first communication device 110.

For example, the request message may be a beacon request message that includes the device identification "ID-A" of the first communication device 110, and at least one of the type identification "ID-m" or the MAC address "ID-2" of the first communication device 110.

In step 506, the network access device 120 detects a current state of the network access device 120. If the network access device 120 is currently in a device-access forbidding state, steps 508-522 are performed. And if the network access device 120 is currently in a device-access permitting state, steps 524-528 are performed.

After receiving the request message requesting for accessing the network, the network access device 120 may detect the current state of the network access device 120. The current state may be either a device-access forbidding state or a device-access permitting state.

In step 508, if the network access device 120 is currently in a device-access forbidding state, the network access device 120 sends a state switching request to the terminal 130 bound with the network access device. The terminal 130 is configured to generate a reply message based on the state switching request. The state switching request may include at least the device identification, for example, "ID-A," of the first communication device 110.

In various embodiments, the network access device 120 may send a state switching request to the terminal 130 immediately after the network access device 120 receives the request message broadcast by the first communication device 110. Alternatively, the network access device 120 may detect, after every preset time period, whether a request message is received during the preset time period. If a request message is received, the network access device 120 may send a state switching request to the terminal 130. During the preset time period, the network access device 120 may receive request messages from various communication devices. The preset time period may be set depending on the actual situation, which is not limited by the present disclosure.

FIG. 5-2 is a flowchart of the step 508 in the method 500, according to an exemplary embodiment. For example, the network access device 120 may send a state switching request to the terminal 130 after every preset time period. Referring to FIG. 5-2, the step 508 may include the following sub-steps.

In sub-step 508-1, the network access device 120 generates a device identification list. The device identification list may include the device identification of each communication device that sends a request message to the network access device 120 during a preset time period starting from and including the point in time when the network access device 120 receives the request message sent by the first communication device 110.

For example, the network access device 120 may first generate a device identification list based on the device identification included in each received request message. The device identification list may include a device identification of each communication device that sends a request message during a preset time period starting from and including the time in point when the network access device 120 receives the request message sent by the first communication device 110. For example, during the preset time period, the network access device 120 may also receive request message sent by the second communication device 150 (FIG. 1) and/or other communication devices. The second communication device 150 may have a device identification "ID-B." The network access device 120 may generate a device identification list based on the device identification "ID-A" of the first communication device 110 and the device identification "ID-B" of the second communication device 150. The device identification list is shown in Table 1.

TABLE 1

Device Identification

ID-A
ID-B
. . .

In sub-step 508-2, the network access device 120 sends to the terminal 130, bound with the network access device 120, the state switching request containing the device identification list. For example, the network access device 120 may send to the terminal 130 the state switch request containing the device identification list as shown in Table 1.

In step 510, the terminal 130 receives the state switching request from the network access device 120.

FIG. 5-3 is a flowchart of step 510 in the method 500, according to an exemplary embodiment. As shown in FIG. 5-3, step 510 may include sub-step 510-1.

In sub-step 510-1, the terminal 130 receives a state switching request including a device identification list. The device identification list includes a device identification of each communication device that sends a request message during a preset time period starting from and including the point in time when the first communication device 110 receives the request message sent by the first communication device 110.

For example, the terminal 130 may receive a state switching request sent by the network access device 120, and the state switching request may contain a device identification list as shown in Table 1. The device identification list in Table 1 records the device identification of each communication device that sends a request message during a preset time period starting from and including the point in time when the network access device 120 receives the request message sent by the first communication device 110.

In step 512, the terminal 130 generates a reply message based on the state switching request.

FIG. 5-4 is a flowchart of step 512 in the method 500, according to an exemplary embodiment. As shown in FIG. 5-4, step 512 may include the following steps.

In sub-step 512-1, the terminal 130 displays the device identification list based on the state switching request.

When the state switching request contains a device identification list, the terminal 130 may display the device identification list. For example, the terminal 130 may display the device identification list in Table 1. The terminal 130 may also display a name of the communication device that corresponds to each device identification. Moreover, the terminal 130 may display a prompt message.

FIG. 5-5 is schematic view illustrating a display interface of the terminal 130, according to the embodiment. As shown in FIG. 5-5, the terminal 130 may display a display interface 132. The display interface 132 contains a device identification list 134 and a prompt message that reads, e.g., "The following devices request for accessing the network. Switch the state?" The device identification list 134 contains the name of the first communication device 110 and the corresponding device identification "ID-A." The device identification list 134 also contains the name of the second communication device 150 and the corresponding device identification "ID-B." As shown in FIG. 5-5, the display interface 132 also contains a "yes" button and a "no" button.

In exemplary embodiments, if the state switching request sent by the network access device 120 does not contain a device identification list, the terminal 130 may only display a prompt message. For example, the prompt message may be: "A communication device requests for accessing the network. Switch the state?" Alternatively, the prompt message may be "2 communication devices request for accessing the network. Switch the state?" The present disclosure does not limit the manner of displaying the information related to the state switching request.

In sub-step 512-2, the terminal 130 receives a user-generated trigger instruction for selecting a target device identification from the device identification list.

After the terminal 130 displays the device identification list, the user may select a device identification from the device identification list. In the present disclosure, the device identification selected by the user is referred to as a target device identification. The network access device 120 then switches the current state of the network access device 120, i.e., the device-access forbidding state, to a device-access permitting state, and connects the communication device corresponding to the target device identification to the network. A trigger instruction may be generated when the user selects a target device identification, and the terminal 130 may subsequently receive the trigger instruction.

For example, referring to FIG. 5-5, the user may click the device identification "ID-B" in the device identification list 134. Thus, the device identification "ID-B" is the target device identification. The terminal 130 may then receive the trigger instruction for selecting the target device identification "ID-B."

In some embodiments, when receiving the trigger instruction, the terminal 130 may consider that the user allows the network access device 120 to switch the device-access forbidding state to a device-access permitting state, and only allows the network access device 120 to connect the communication device corresponding to the target device identification to the network. For example, when receiving a trigger instruction selecting the target device identification "ID-B," the terminal may consider that the user only allows the network access device 120 to connect the communication device (i.e., the second communication device 150) corresponding to the target device identification "ID-B" to the network.

In some embodiments, the trigger instruction may also be configured to allow the network access device 120 to connect all the communication devices on the device identification list to the network. For example, referring to FIG. 5-5, the user may click the "yes" button in the display interface 132. A corresponding trigger instruction may be generated. When receiving the trigger instruction, the terminal 130 may consider that the user allows the network access device 120 to switch the device-access forbidding state to a device-access permitting state, and allows the network access device 120 to connect all the communication devices requesting for accessing the network to the network. However, if the user does not want to allow the network access device 120 to switch the device-access forbidding state to the device access permitting state, the user may click the "no" button in the display interface 132 to generate a corresponding trigger instruction.

In sub-step 512-3, the terminal 130 generates, based on the trigger instruction, a reply message including the target device identification.

When receiving a user-generated trigger instruction for selecting the target device identification, the terminal 130 may generate a reply message including the target device identification. For example, the reply message may be "permitting the communication device corresponding to the device identification 'ID-B' to access network."

Consistent with the disclosed embodiments, referring to FIG. 5-5, if the user clicks the "yes" button in the display interface 132, the reply message may be "permitting the device-access forbidding state to be switched to a device-access permitting state." However, if the user clicks the "no" button in the display interface 132, the reply message may be "forbidding the device-access forbidding state to be switched to a device-access permitting state." The above-illustrated reply messages are only exemplary, and shall not limit the scope of the present disclosure.

In step 514, the terminal 130 sends the reply message to the network access device 120. The network access device 120 is configured to, if the reply message instructs the network access device 120 to enter a device-access permitting state, switch the state of the network access device 120 to a device-access permitting state.

As an example, the reply message may be "permitting the device-access forbidding state to be switched to a device-access permitting state" or "permitting the communication device corresponding to the device identification 'ID-B' to access the network."

In step 516, the network access 120 device receives the reply message sent by the terminal 130.

For example, the network access device 120 receives from the terminal 130 a reply message "permitting the device-access forbidding state to be switched to a device-access permitting state" or "permitting the communication device corresponding to the device identification 'ID-B' to access the network."

In step 518, if the reply message instructs the network access device 120 to switch to a device-access permitting state, the network access device 120 changes the device-access forbidding state to a device-access permitting state.

Figures 5, 6, 7:
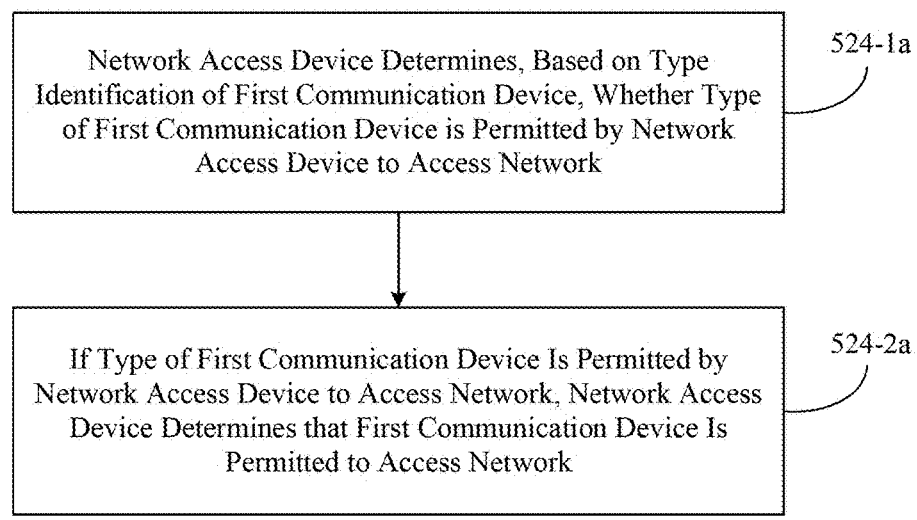

After the network access device 120 switches the device-access forbidding state to the device-access permitting state, if the network access device 120 is left in the device-access permitting state, the network access device 120 may also connect malicious communication devices to the network. To solve this issue, the network access device 120 may be maintained in the device-access permitting state for a preset time window, and then switched to the device-access forbidding state after the preset time window elapses. FIG. 5-6 is a flowchart of a step 518 in the method 500, according to an exemplary embodiment. As shown in FIG. 5-6, step 518 may include sub-step 518-1.

In sub-step 518-1, the network access device 120 switches the device access-forbidding state to a device-access permitting state, and maintains the device-access permitting state for a preset time window.

The preset time window may be set as desired, which is not limited by the present disclosure. For example, the preset time window may be 1 minute.

In some embodiments, the preset time window may be negotiated in advance by the network access device 120 and the terminal 130, or may be determined by the network access device 120 based on a condition of the network access device 120. For example, the reply message sent by the terminal 130 may specify a time window, and the network access device 120 may maintain the device-access permitting state for a period equal to the specified time window.

In step 520, the network access device 120 connects the communication device corresponding to the target device identification to the network.

If in step 516 the network access device 120 receives a reply message containing a target device identification, the network access device 120 may connect the communication device corresponding to the target device identification to the network. For example, if the network access device 120 receives the reply message "permitting the communication device corresponding to the device identification 'ID-B' to access the network", the network access device 120 connects the communication device (i.e., the second communication device 150) corresponding to the target device identification "ID-B" to the network.

In step 522, the network access device 120 sends a response message to the communication device corresponding to the target device identification, such as the second communication device 150. The response message indicates that the communication device corresponding to the target device identification has been properly connected to the network.

The response message may include an associated permitting field. If the associated permitting field has a first preset value, the response message indicates the connection to the network is properly completed. If the associated permitting field has a second preset value, the response message indicates the connection to the network fails. For example, the first preset value may be 1, and the second preset value may be 0.

In step 524, if in step 506 the network access device 120 is detected to be in a device-access permitting state, the network access device 120 determines whether the first communication device 110 is permitted by the network access device 120 to access the network.

Since the request message broadcast by the first communication device 110 may include at least one of the type identification or the address of the first communication device 110, the network access device 120 may determine, based on the type identification or address, whether the first communication device 110 permitted by the network access device 120 to access the network.

FIG. 5-7 is a flowchart of step 524 in the method 500, according to an exemplary embodiment. For example, in this embodiment, the network access device 120 may determine, based on the type identification of the first communication device 110, whether the first communication device 110 is permitted by the network access device 120 to access the network. As shown in FIG. 5-7, step 524 may include the following sub-steps.

In sub-step 524-1a, the network access device 120 determines, based on the type identification of the first communication device 110, whether the type of the first communication device 110 is permitted by the network access device 120 to access the network.

The network access device 120 may store type identifications corresponding to the types of communications devices that are permitted to access the network. The network access device 120 may determine whether the type identification of the first communication device 110 belongs to the type identifications stored in the network access device 120. For example, based on the type identification of the first communication device 110, the network access device 120 may search in the stored type identifications. If the type identification of the first communication device 110 matches one of the stored type identifications, the network access device 120 determines that the type of the first communication device 110 is permitted to access the network. For example, the stored type identifications may be shown in the following Table 2.

TABLE 2

| Type Identification |
| --- |
| ID-n |
| ID-m |
| . . . |

Referring to Table 2, the stored type identifications include "ID-n" and "ID-m." "ID-m" is the type identification of the first communication device 110. Since the type identification of the first communication device 110 matches one of the stored type identifications, the network access device 120 determines that the type of the first communication device 110 is permitted to access the network.

In sub-step 524-2a, if the type of the first communication device 110 is permitted by the network access device 120 to access the network, the network access device 120 determines that the first communication device 110 is permitted to access the network.

FIG. 5-8 is a flowchart of step 524 in the method 500, according to another exemplary embodiment. For example, in this embodiment, the network access device 120 may determine whether the first communication device 110 is permitted to access the network based on the address of the first communication device 110. As shown in FIG. 5-8, step 524 may include the following sub-steps.

In sub-step 524-1b, the network access device 120 determines whether the address of the first communication device 120 belongs to a range of addresses permitted by the network access device 120 to access the network.

The network access device 120 may store an address range permitted to access the network. The network access device 120 may determine whether the address of the first communication device 110 belongs to the stored address range that is permitted to access the network. For example, the address range permitted to access the network may be [ID-1, ID-100], which contains 100 addresses, i.e., ID-1, ID-2, ID-3, . . . ID-100. As noted above, "ID-2" is the address of the first communication device 110, and belongs to address range [ID-1, ID-100].

In sub-step 524-2b, if the address of the first communication device 110 belongs to the range of addresses permitted by the network access device 120 to access the network, the network access device 120 determines that the first communication device is permitted to access the network.

In the above example, since the address "ID-2" of the first communication device 110 belongs to the address range [ID-1, ID-100], which is permitted by the network access device 120 to access the network, the network access device 120 determines that the first communication device 110 permitted to access the network.

In step 526, if the first communication device 110 is permitted by the network access device 120 to access the network, the network access device 120 connects the first communication device 110 to the network.

In step 528, the network access device 120 sends a response message to the first communication device 110. The response message indicates that the first communication device 110 has been properly connected to the network.

After connecting the first communication device 110 to the network, the network access device 120 may send a response message to the first communication device 110. The response message may include an associated permitting field. If the associated permitting field has a first preset value, the response message indicates that the connection to the network is properly completed. If the associated permitting field has a second preset value, the response message indicates that the connection to the network fails. For example, the first preset value may be 1, and the second preset value may be 0.

Moreover, if in step 506 the network access device 120 detects that the network access device 120 is currently in a device-access forbidding state, the network access device 120 may also send a response message to the first communication device 110, with the associated permitting field in the response message set to the second preset value. This response message means that the connection of the first communication device 110 to the network fails. The first communication device 110 may then broadcast to the network access device 120 a second request message requesting for accessing the network.

It should be noted that orders of the steps in method 500 may be properly adjusted, and may be added or removed as desired. For example, steps 524-528 may be performed after or prior to steps 508-522. Modification to the method 500 may be achieved by one skilled in the art, and will not be elaborated herein.

In the method 500, the network access device receives a request message broadcast by a first communication device, and detects a current state of the network access device. If the network access device is currently in a device-access forbidding state, the network access device sends a state switching request to a terminal bound with the network access device, and switches the device-access forbidding state to a device-access permitting state based on a reply message sent by the terminal. After the state is switched, the network access device may connect the first communication device to a network. By configuring the network access device to send the state switching request to the terminal, the method 500 may achieve an advantageous effect of simplifying the network access process.

The following are device embodiments of the present disclosure, which may be configured to perform the method embodiments of the present disclosure. Unless otherwise stated, the device embodiments incorporate all the features described in the method embodiments.

FIG. 6 is a block diagram of a device 600 for accessing a network, according to an exemplary embodiment. For example, the device 600 may be implemented as a part or the whole of the network access device 120 (FIG. 1) in a form of software, or hardware, or a combination of both. As shown in FIG. 6, the device 600 may include a first receiving module 602, a detecting module 604, a first sending module 606, a second receiving module 608, and a switching module 610.

The first receiving module 602 is configured to receive a request message requesting for accessing the network. The request message may be broadcast by a first communication device.

The detecting module 604 is configured to detect a current state of the network access device.

The first sending module 606 is configured to, if the detecting module 604 determines that the network access device is currently in a device-access forbidding state, send a state switching request to a terminal bound with the network-access device. The terminal is configured to generate a reply message based on the state switching request.

The second receiving module 608 is configured to receive the reply message sent by the terminal.

The switching module 610 is configured to, if the reply message instructs switching the state of the network access device to a device-access permitting state, switch the state of the network access device to the device-access permitting state.

FIG. 7 is a block diagram of a device 700 for accessing a network, according to an exemplary embodiment. For example, the device 700 may be implemented as a part or the whole of the network device 120 (FIG. 1) in a form of software, or hardware, or a combination of both. As shown in FIG. 7, the device 700 may include a first receiving module 702, a detecting module 704, a first sending module 706, a second receiving module 708, and a switching module 710, similar to the first receiving module 602, the detecting module 604, the first sending module 606, the second receiving module 608, and the switching module 610 (FIG. 6).

In some embodiments, the request message contains a device identification of the first communication device. Correspondingly, the state switching request also contains the device identification of the first communication device. The first sending module 706 is further configured to generate a device identification list, the device identification list including the device identification of each communication device that sends a request message during a preset time period starting from and including the point in time when the network access device receives the request message broadcast by the first communication device; and send to the terminal the state switching request including the device identification list.

In some embodiments, the reply message contains a target device identification. The target device identification is a device identification selected by a user of the terminal from the device identification list. Accordingly, the device 700 further includes a first connecting module 712 and a second sending module 714. The first connecting module 712 is configured to connect a communication device corresponding to the target device identification to the network. The second sending module 714 is configured to send a response message to the communication device corresponding to the target device identification. The response message indicates that the communication device corresponding to the target device identification has been properly connected to the network.

In some embodiments, the device 700 further includes a determining module 716, a second connecting module 718, and a third sending module 720. The determining module 716 is configured to, if the detecting module 704 determines that the network access device is in a device-access permitting state, determine whether the first communication device is permitted by the network access device to access the network. The second connecting module 718 is configured to, if the determining module 716 determines that the first communication device is permitted by the network access device to access the network, connect the first communication device to the network. The third sending module 720 is configured to send a response message to the first communication device. The response message indicates that the first communication device has been properly connected to the network.

In some embodiments, the request message includes a type identification of the first communication device. Correspondingly, the determining module 716 is further configured to: determine, based on the type identification of the first communication device, whether a type of the first communication device is permitted by the network access device to access the network; and if the type of the first communication device is permitted to access the network, determine that the first communication device is permitted to access the network.

In some embodiments, the request message includes an address of the first communication device. Correspondingly, the determining module 716 is configured to: determine whether the address of the first communication device belongs to a range of addresses permitted by the network access device to access the network; and if the address of the first communication device belongs to the range of addresses permitted to access the network, determine that the first communication device is permitted to access the network.

In some embodiments, the switching module 710 is further configured to switch the state of the network access device to a device-access permitting state, and maintain the network access device in the device-access permitting state for a preset time window.

Figures 5, 6, 7, 8:
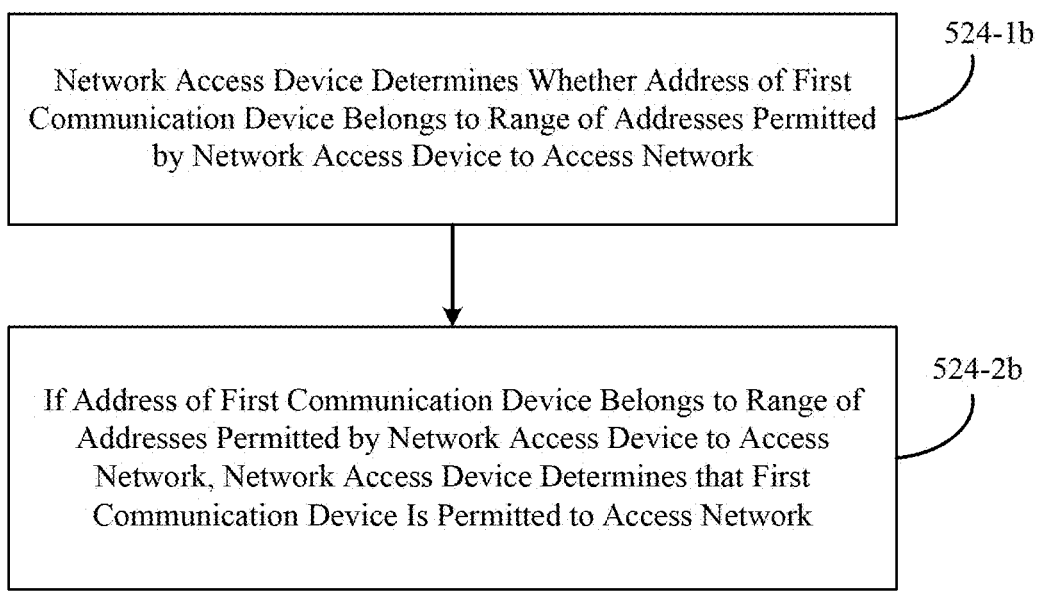
Figure 6:
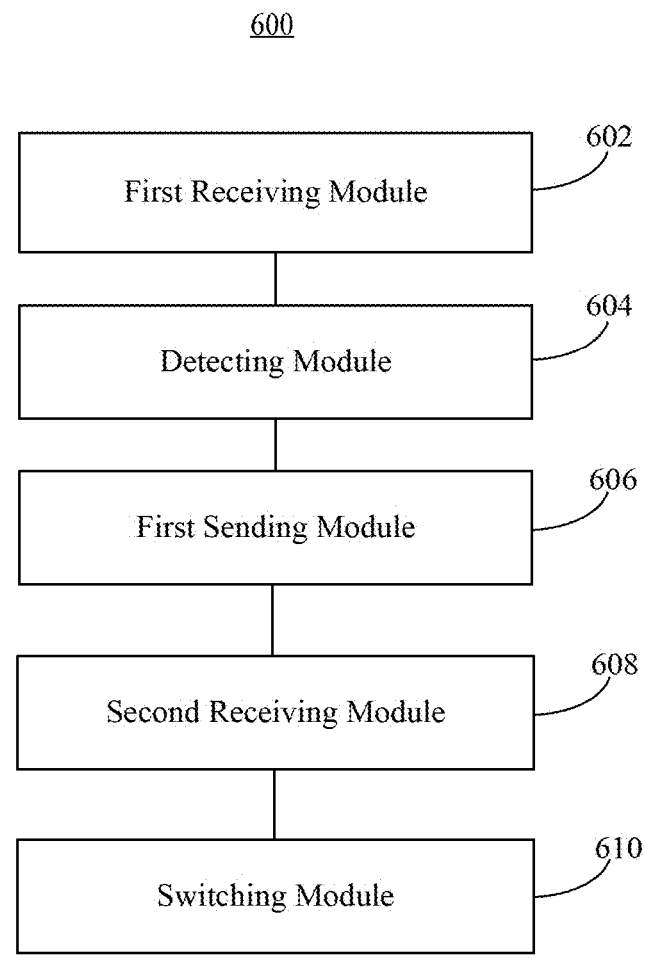
Figure 7:
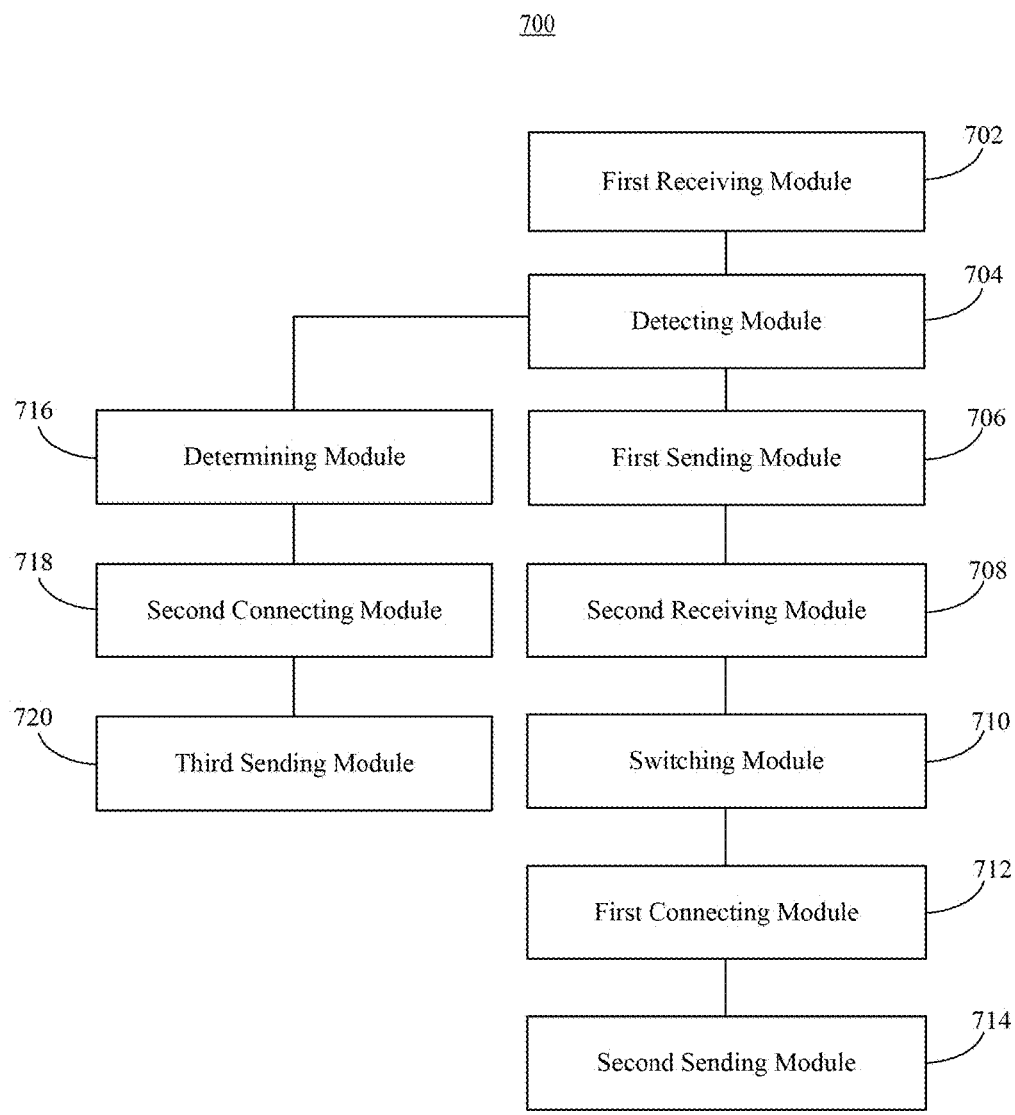
Figure 8:
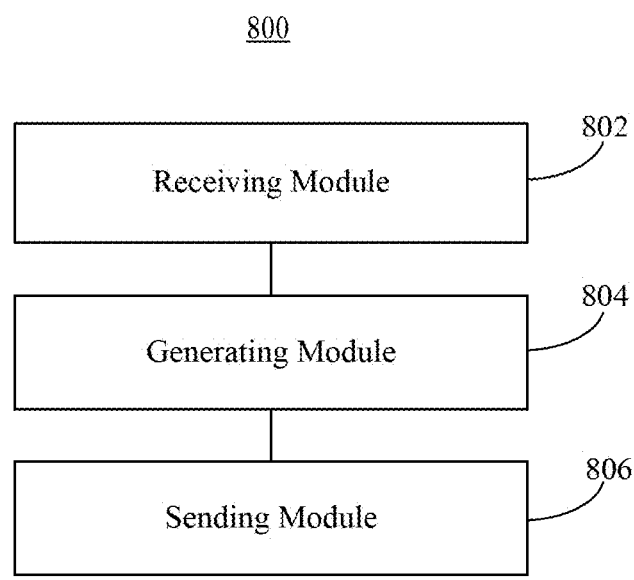

FIG. 8 is a block diagram of a device 800 for accessing a network, according to an exemplary embodiment. For example, the device 800 may be implemented as a part or the whole of the terminal 130 (FIG. 1) in a form of software, or hardware, or a combination of both. As shown in FIG. 8, the device 800 may include a receiving module 802, a generating module 804, and a sending module 806.

The receiving module 802 is configured to receive a state switching request sent by a network access device bound with the terminal. The network access device may send the state switching request after determining that the network access device is in a device-access forbidding state. The network access device may make the determination upon receiving a request message requesting for accessing the network. The request message may be broadcast by a first communication device.

The generating module 804 is configured to generate a reply message based on the state switching request received by the receiving module 802.

The sending module 806 is configured to send the reply message generated by the generating module 804 to the network access device. The network access device is configured to, if the reply message instructs the network access device to switch to a device-access permitting state, change the device-access forbidding state to a device-access permitting state.

In some embodiments, the state switching request includes a device identification of the first communication device. Correspondingly, the receiving module 802 is further configured to receive from the network access device a state switching request including a device identification list. The device identification list includes the device identification of each communication device that sends a request message during a preset time period starting from and including the point in time when the network access device receives the request message sent by the first communication device.

In some embodiments, the generating module 804 is further configured to display the device identification list based on the state switching request; receive a user-generated trigger instruction for selecting a target device identification from the device identification list; and generate, based on the trigger instruction, the reply message including the target device identification.

Figure 9:
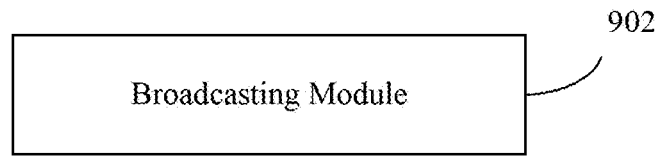
FIG. 9 is a block diagram of a device for accessing a network, according to an exemplary embodiment.

FIG. 9 is a block diagram of a device 900 for accessing a network, according to an exemplary embodiment. For example, the device 900 may be implemented as a part or the whole of the first communication device 110 (FIG. 1) in a form of software, or hardware, or a combination of both. As shown in FIG. 9, the device 900 may include a broadcasting module 902.

The broadcasting module 902 is configured to broadcast to a network access device a request message requesting for accessing the network. The network access device is configured to detect a current state of the network access device. If the network access device is in a device-access forbidding state, the network access device sends a state switching request to a terminal bound with the network access device.

Optionally, the request message may contain a device identification of the first communication device. And the request message may further contain at least one of a type identification or an address of the first communication device.

Figure 10:
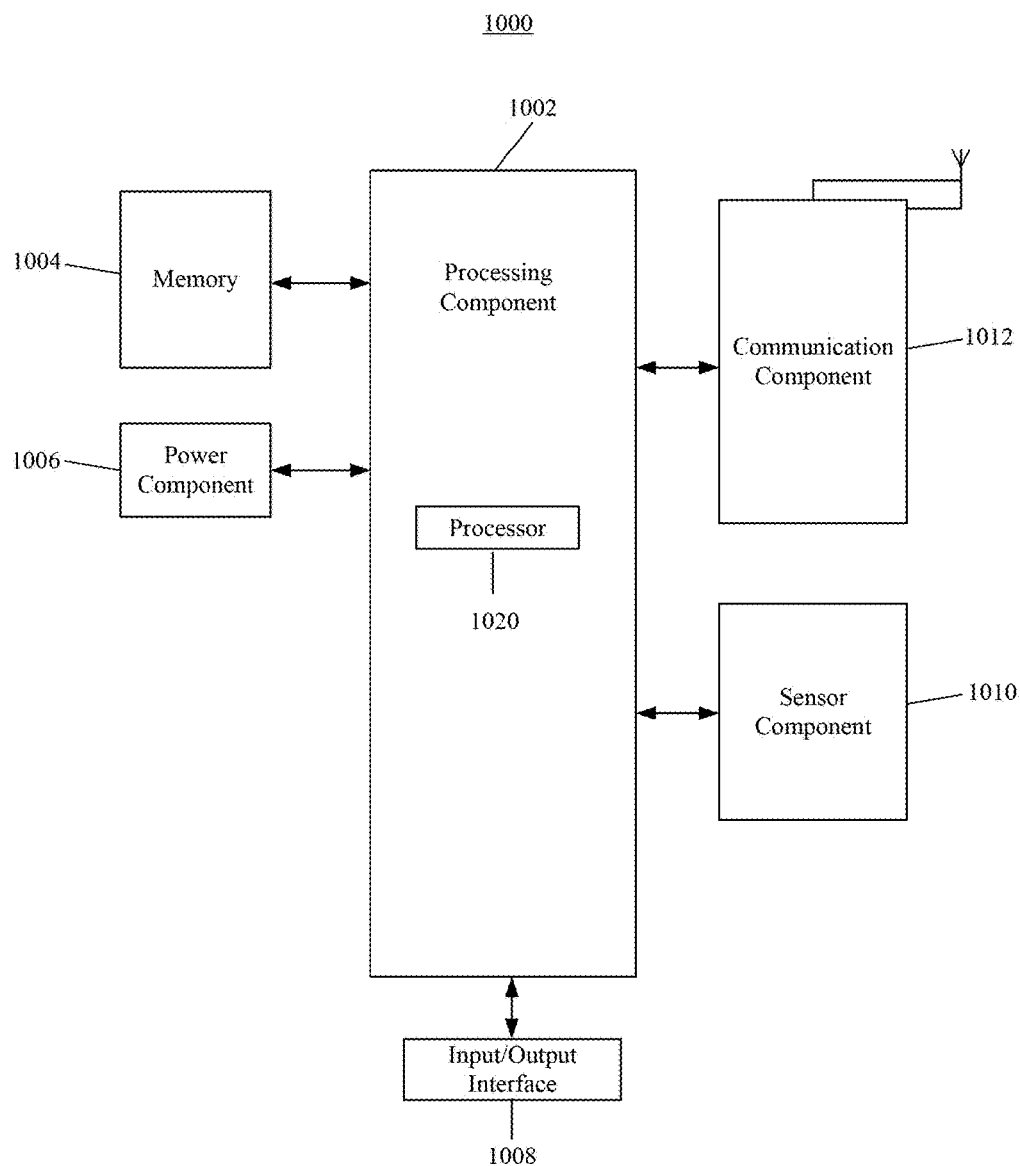
FIG. 10 is a block diagram of a device for accessing a network, according to an exemplary embodiment.

FIG. 10 is a block diagram of a device 1000 for accessing a network, according to an exemplary embodiment. For example, the device 1000 may be the network access device 120 (FIG. 1). For example, the device 1000 may be a gateway, a router, and the like.

Referring to FIG. 10, the device 1000 may include one or more of the following components: a processing component 1002, a memory 1004, a power component 1006, an input/output (I/O) interface 1008, a sensor component 1010, and a communication component 1012.

The processing component 1002 typically controls overall operations of the device 1000, such as the operations associated with data communications and recording operations. The processing component 1002 may include one or more processors 1020 to execute instructions to perform all or part of the steps in the above described methods. Moreover, the processing component 1002 may include one or more modules which facilitate the interaction between the processing component 1002 and other components.

The memory 1004 is configured to store various types of data to support the operation of the device 1000. Examples of such data include instructions for any applications or methods operated on the device 1000, messages, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The I/O interface 1008 provides an interface between the processing component 1002 and peripheral interface modules, such as a click wheel, buttons, and the like. The buttons may include, but are not limited to, a starting button and a locking button.

The sensor component 1010 includes one or more sensors to provide status assessments of various aspects of the device 1000. For instance, the sensor component 1010 may detect an open/closed status of the device 1000, relative positioning of components, e.g., a button, of the device 1000, a change in position of the device 1000 or a component of the device 1000, a presence or absence of user contact with the device 1000. The sensor component 1010 may include a proximity sensor configured to detect the presence of nearby objects without any physical contact. In some embodiments, the sensor component 1010 may also include an accelerometer sensor, a gyroscope sensor, a magnetic sensor, a pressure sensor, or a temperature sensor.

The communication component 1012 is configured to facilitate communication, wired or wirelessly, between the device 1000 and other devices. The device 1000 can access a wireless network based on a communication standard, such as WiFi, 2G, 3G, 4G, or a combination thereof. In one exemplary embodiment, the communication component 1012 receives a broadcast signal or broadcast associated information from an external broadcast management system via a broadcast channel In one exemplary embodiment, the communication component 1012 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

Figure 11:
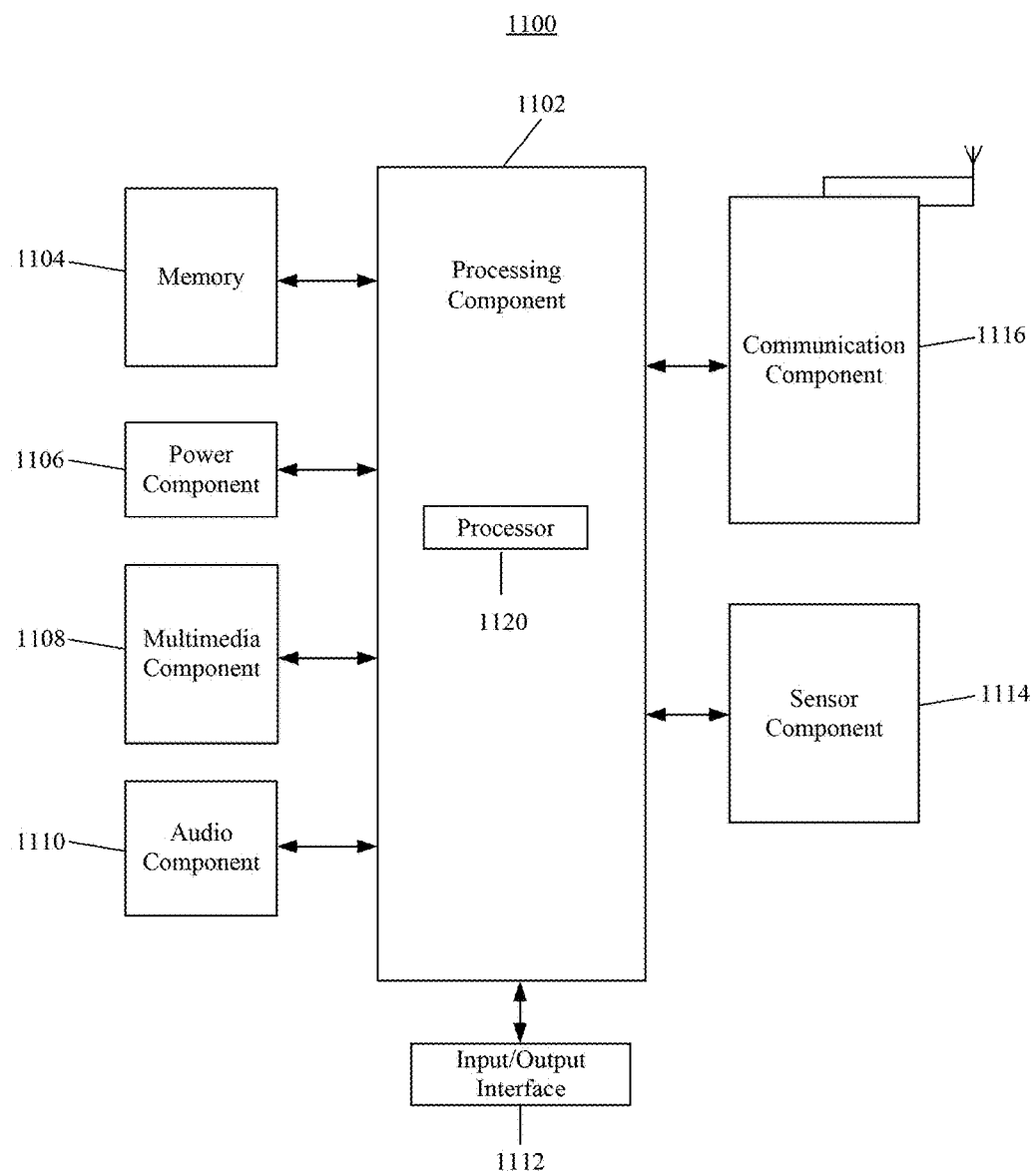
FIG. 11 is a block diagram of a device for accessing a network, according to an exemplary embodiment.

FIG. 11 is a block diagram of a device 1100 for accessing a network, according to an exemplary embodiment. The device 1100 may be a terminal, such as the terminal 130 (FIG. 1). For example, the device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a SRAM, an EEPROM, an EPROM, a PROM, a ROM, a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a LCD and a TP. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G, 3G, 4G, or a combination thereof. In one exemplary embodiment, the communication component 1116 receives a broadcast signal or broadcast associated information from an external broadcast management system via a broadcast channel In one exemplary embodiment, the communication component 1116 further includes a NFC module to facilitate short-range communications. For example, the NFC module may be implemented based on a RFID technology, an IrDA technology, a UWB technology, a BT technology, and other technologies.

In exemplary embodiments, the device 1100 may be implemented with one or more ASICs, DSPs, DSPDs, PLDs, FPGAs, controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

Figure 12:
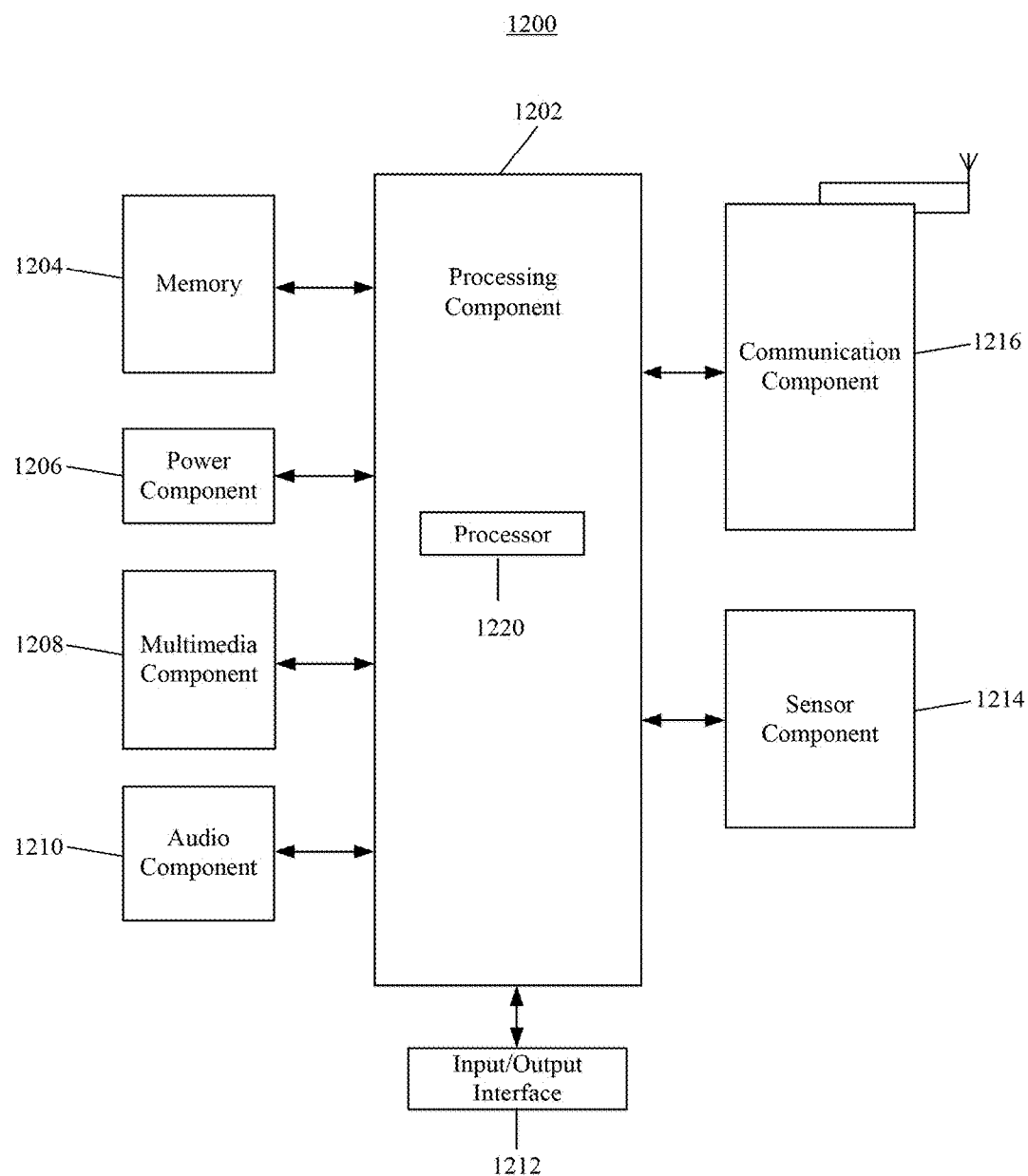
FIG. 12 is a block diagram of a device for accessing a network, according to an exemplary embodiment.

FIG. 12 is a block diagram of a device 1200 for accessing a network, according to an exemplary embodiment. The device 1200 may be a communication device, such as the first communication device 110 (FIG. 1). For example, the device 1200 may be a smart camera, a smart socket, a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component 1202, a memory 1204, a power component 1206, a multimedia component 1208, an audio component 1210, an I/O interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a SRAM, an EEPROM, an EPROM, a PROM, a ROM, a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a LCD and a touch panel TP. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G, 3G, 4G, or a combination thereof. In one exemplary embodiment, the communication component 1216 receives a broadcast signal or broadcast associated information from an external broadcast management system via a broadcast channel In one exemplary embodiment, the communication component 1216 further includes a NFC module to facilitate short-range communications. For example, the NFC module may be implemented based on a RFID technology, an IrDA technology, a UWB technology, a BT technology, and other technologies.

In exemplary embodiments, the device 1200 may be implemented with one or more ASICs, DSPs, DSPDs, PLDs, FPGAs, controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

Figure 13:
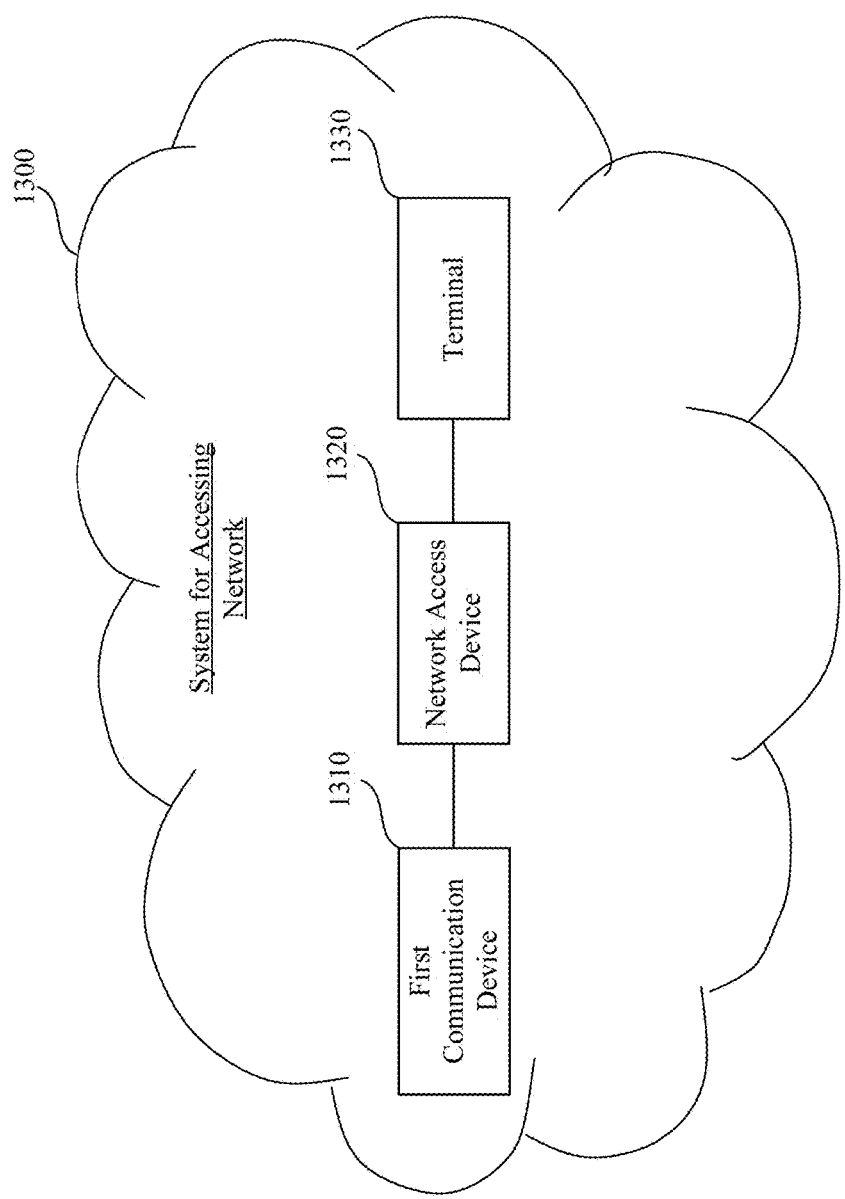
FIG. 13 is a schematic diagram of a system for accessing a network, according to an exemplary embodiment.

FIG. 13 is a schematic diagram of a system 1300 for accessing a network, according to an exemplary embodiment. As shown in FIG. 13, the system 1300 may include a first communication device 1310, a network access device 1320, and a terminal 1330.

The first communication device 1310 may include the device 900 (FIG. 9) and/or device 1200 (FIG. 12).

The network access device 1320 may include the device 600 (FIG. 6), device 700 (FIG. 7), and/or device 1000 (FIG. 10).

The terminal 1330 may include the device 800 (FIG. 8) and/or device 1100 (FIG. 11).

In the disclosed embodiments, by the network access device 1320 sending a state switching request to the terminal 1330, the system 1300 may achieve an advantageous effect of simplifying the network access process.

Other embodiments of the invention will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for use in a network access device, the method comprising:
receiving a request message requesting for accessing a network, the request message being broadcast by a first communication device;
detecting a current state of the network access device;
in response to the network access device being in a device-access forbidding state:
sending a state switching request to a terminal bound with the network access device, the terminal being configured to generate a reply message based on the state switching request;
receiving the reply message sent by the terminal; and
when the reply message instructs the network access device to switch to a device-access permitting state, switching the state of the network access device to the device-access permitting state,
wherein the request message includes a device identification of the first communication device, and the sending of the state switching request to the terminal bound with the network access device comprises:
generating a device identification list, the device identification list including a device identification of each communication device that sends a request message to the network access device during a preset time period starting from when the network access device receives the request message broadcast by the first communication device; and sending the state switching request to the terminal, the state switching request including the device identification list.

2. The method according to claim 1, wherein the reply message includes a target device identification, the target device identification being a device identification selected by a user of the terminal from the device identification list, and the method further comprises:

connecting a communication device corresponding to the target device identification to the network; and sending a second response message to the communication device corresponding to the target device identification, the second response message indicating that the communication device corresponding to the target device identification has been properly connected to the network.

3. The method according to claim 1, wherein the switching the state of the network access device to the device-access permitting state comprises:

after switching the state of the network access device to the device-access permitting state, maintaining the network access device in the device-access permitting state for a preset time window.

4. The method according to claim 1, further comprising:

in response to the network access device being in a device-access permitting state:

determining whether the first communication device is permitted by the network access device to access the network;

when it is determined that the first communication device is permitted by the network access device to access the network, connecting the first communication device to the network; and sending a first response message to the first communication device, the first response message indicating that the first communication device has been properly connected to the network.

5. The method according to claim 4, wherein the request message includes a type identification of the first communication device, and the determining of whether the first communication device is permitted by the network access device to access the network comprises:

determining, based on the type identification of the first communication device, whether a type of the first communication device is permitted by the network access device to access the network; and when it is determined that the type of the first communication device is permitted by the network access device to access the network, determining that the first communication device is permitted by the network access device to access the network.

6. The method according to claim 4, wherein the request message includes an address of the first communication device, and the determining of whether the first communication device is permitted by the network access device to access the network comprises:

determining whether the address of the first communication device belongs to a range of addresses permitted by the network access device to access the network; and when it is determined that the address of the first communication device belongs to the range of addresses permitted by the network access device to access the network, determining that the first communication device is permitted by the network access device to access the network.

7. A network access device, comprising:

a processor; and a memory for storing instructions executable by the processor;

wherein the processor is configured to perform:

receiving a request message requesting for accessing a network, the request message being broadcast by a first communication device;

detecting a current state of the network access device;

in response to the network access device being in a device-access forbidding state:

sending a state switching request to a terminal bound with the network access device, the terminal being configured to generate a reply message based on the state switching request;

receiving the reply message sent by the terminal; and when the reply message instructs the network access device to switch to a device-access permitting state, switching the state of the network access device to the device-access permitting state, wherein the request message includes a device identification of the first communication device, and the processor is further configured to perform:

generating a device identification list, the device identification list including a device identification of each communication device that sends a request message to the network access device during a preset time period starting from when the network access device receives the request message broadcast by the first communication device; and sending the state switching request to the terminal, the state switching request including the device identification list.

8. The network access device according to claim 7, wherein the reply message includes a target device identification, the target device identification being a device identification selected from the device identification list, and the processor is further configured to perform:

connecting a communication device corresponding to the target device identification to the network; and sending a second response message to the communication device corresponding to the target device identification, the second response message indicating that the communication device corresponding to the target device identification has been properly connected to the network.

9. The network access device according to claim 7, wherein the processor is further configured to perform:

after switching the state of the network access device to the device-access permitting state, maintaining the network access device in the device-access permitting state for a preset time window.

10. The network access device according to claim 7, wherein the processor is further configured to perform:

in response to the network access device being in a device-access permitting state:

determining whether the first communication device is permitted by the network access device to access the network;

when it is determined that the first communication device is permitted by the network access device to access the network, connecting the first communication device to the network; and sending a first response message to the first communication device, the first response message indicating that the first communication device has been properly connected to the network.

11. A method for use in a terminal, comprising:
receiving a state switching request from a network access device bound with the terminal, the state switching request being sent by the network access device after the network access device determines that the network access device is currently in a device-access forbidding state upon receiving a request message broadcast by a first communication device requesting for accessing a network;
generating a reply message based on the state switching request; and
sending the reply message to the network access device, wherein the network access device is configured to, if the reply message instructs the network access device to switch to a device-access permitting state, switch the state of the network access device to the device-access permitting state,
wherein the state switching request includes a device identification list, the device identification list including a device identification of each communication device that sends a request message during a preset time period starting from when the network access device receives the request message broadcast by the first communication device.

12. The method according to claim 11, wherein the generating of the reply message based on the state switching request comprises:
displaying the device identification list based on the state switching request;
receiving a user-generated trigger instruction for selecting a target device identification from the device identification list; and
generating, based on the trigger instruction, the reply message including the target device identification.

13. A terminal, comprising:
a processor; and
a memory for storing instructions executable by the processor;
wherein the processor is configured to perform:
receiving a state switching request from a network access device bound with the terminal, the state switching request being sent by the network access device after the network access device determines that the network access device is currently in a device-access forbidding state upon receiving a request message broadcast by a first communication device requesting for accessing a network;
generating a reply message based on the state switching request; and
sending the reply message to the network access device, wherein the network access device is configured to, if the reply message instructs the network access device to switch to a device-access permitting state, switch the state of the network access device to the device-access permitting state,
wherein the state switching request includes a device identification list, the device identification list including a device identification of each communication device that sends a request message during a preset time period starting from when the network access device receives the request message broadcast by the first communication device.

14. The terminal according to claim 13, wherein the generating of the reply message based on the state switching request comprises:
displaying the device identification list based on the state switching request;
receiving a user-generated trigger instruction for selecting a target device identification from the device identification list; and
generating, based on the trigger instruction, the reply message including the target device identification.

* * * * *